United States Patent [19]

Puisais et al.

[11] Patent Number: 4,648,544

[45] Date of Patent: Mar. 10, 1987

[54] INTERNAL CHUCK FOR BUTT WELDING TWO TUBES

[75] Inventors: Xavier F. Puisais, Levallois Perret; Jean-Pierre Hamon, Cergy; Michel Jégousse, Saint-Herblain; Michel Kaluszynski, Vitry-Sur-Seine, all of France

[73] Assignee: Total Compagnie Francaise des Petroles, Paris, France

[21] Appl. No.: 785,650

[22] Filed: Oct. 9, 1985

[30] Foreign Application Priority Data

Oct. 22, 1984 [FR] France ............................... 84 16112

[51] Int. Cl.$^4$ .............................................. B23K 37/00
[52] U.S. Cl. .................................. 228/44.5; 228/49.3; 228/50; 219/61.1
[58] Field of Search ........................ 228/44.5, 49.3, 50, 228/212; 219/8.5, 9.5, 60 A, 61.1, 61, 60 R, 61.13, 59.1

[56] References Cited

U.S. PATENT DOCUMENTS

| | | | |
|---|---|---|---|
| 4,053,973 | 10/1977 | Meli | 228/44.5 X |
| 4,310,737 | 1/1982 | Paton et al. | 219/61.1 X |
| 4,418,860 | 12/1983 | LaForce | 228/44.5 X |

FOREIGN PATENT DOCUMENTS 2098118 11/1982 United Kingdom ............... 219/61.1

Primary Examiner—Nicholas P. Godici
Assistant Examiner—Carmine Cuda
Attorney, Agent, or Firm—Sughrue, Mion, Zinn, Macpeak and Seas

[57] ABSTRACT

An internal chuck for use in the butt welding of tubes 16, 17 aligning the tubes and for bringing them into abutment comprises a central tube 6, a sleeve 7 slidable on the central tube and carrying centering means 12 and welding backup means 8, the centering means and the welding backup means being longitudinally spaced from one another, gripping means 2, and jaws 33 for clamping against the tubes. The jaws are displaceable longitudinally relative to the gripping means and central tube to draw the two tubes together and a jack 27 is provided for displacing the sleeve longitudinally relative to the central tube so that either the centering means or the welding backup means can be aligned with the ends of the tubes.

3 Claims, 12 Drawing Figures

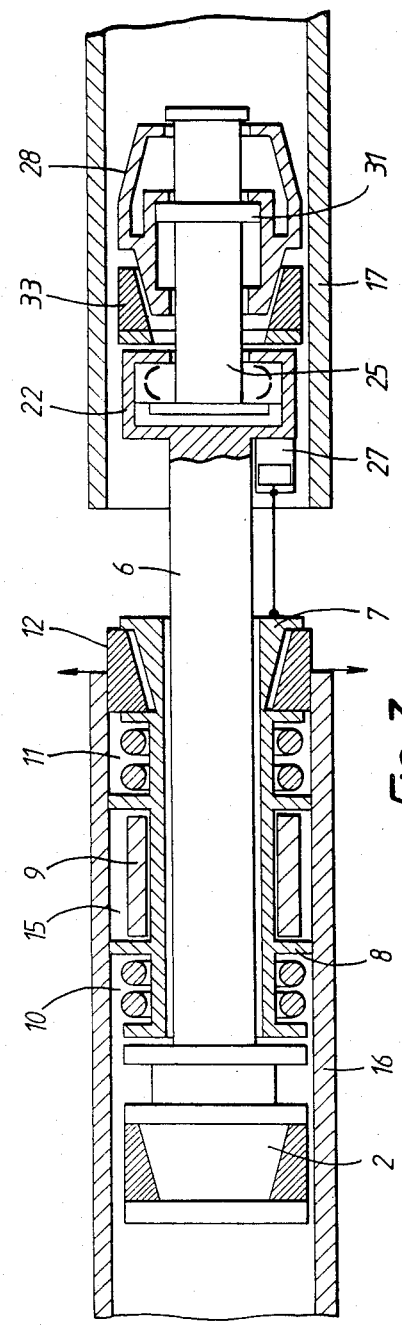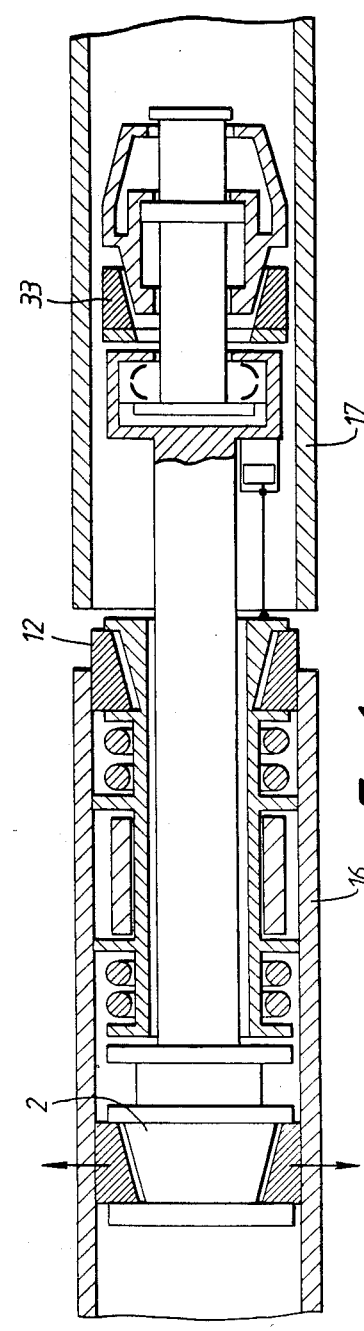

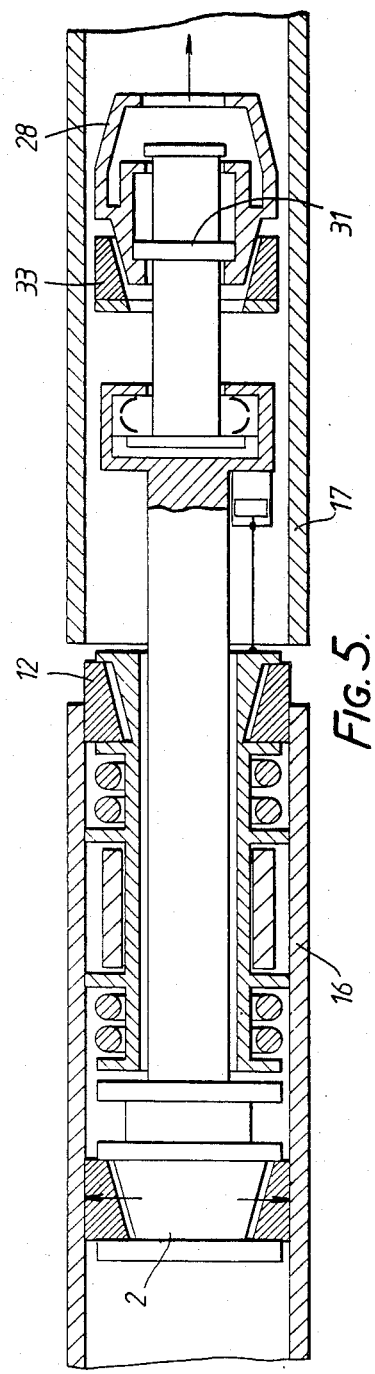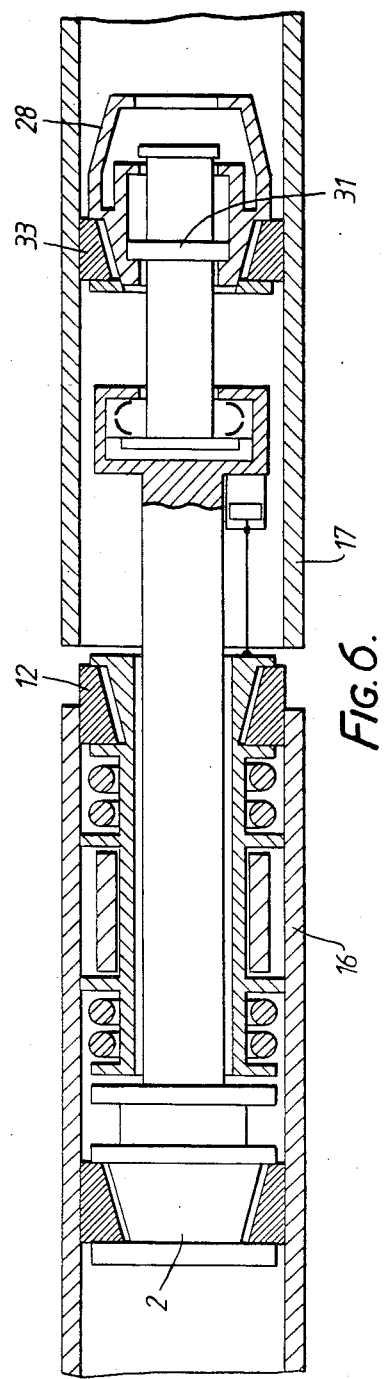

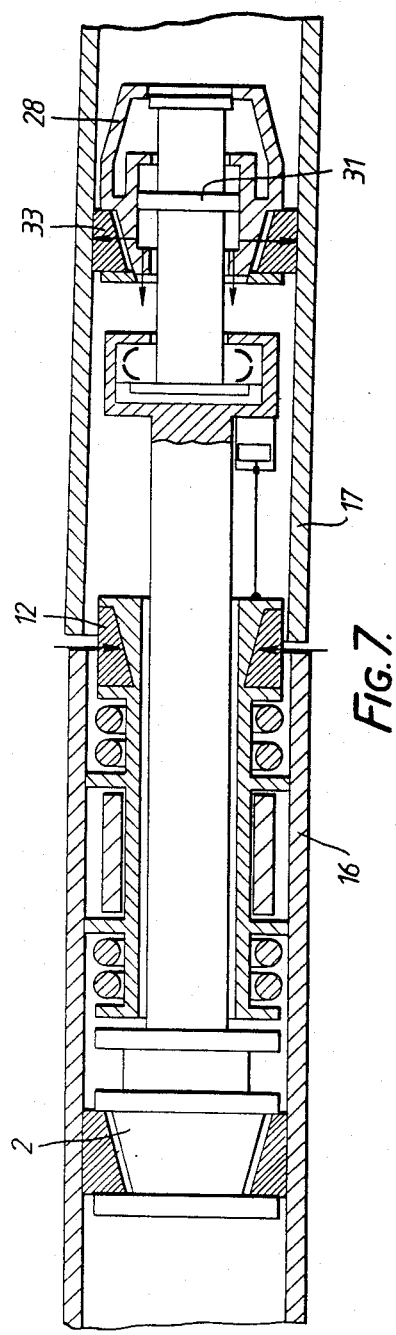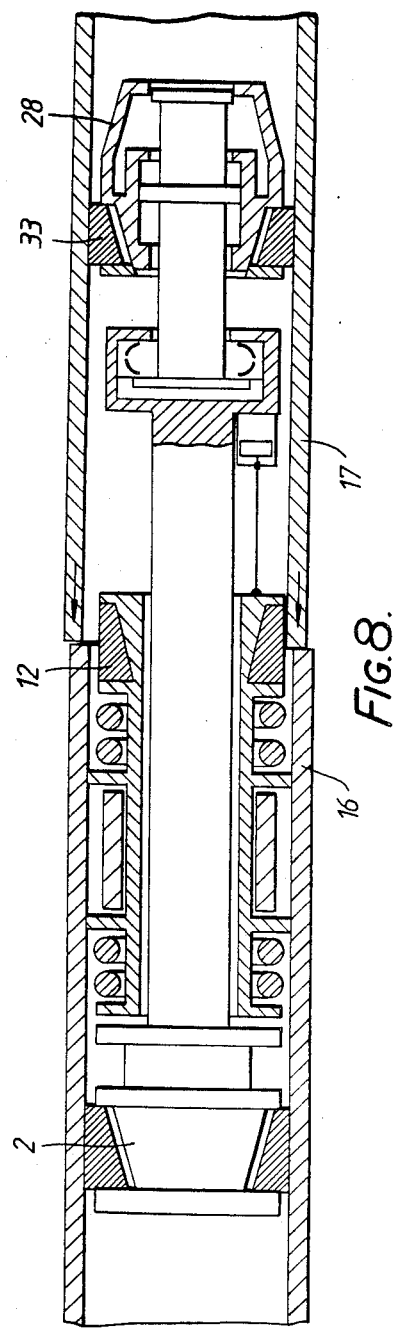

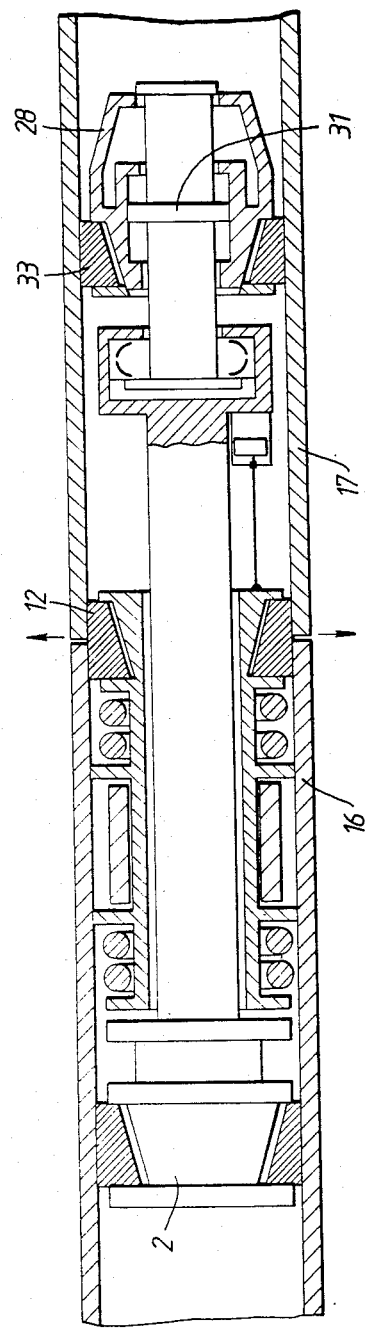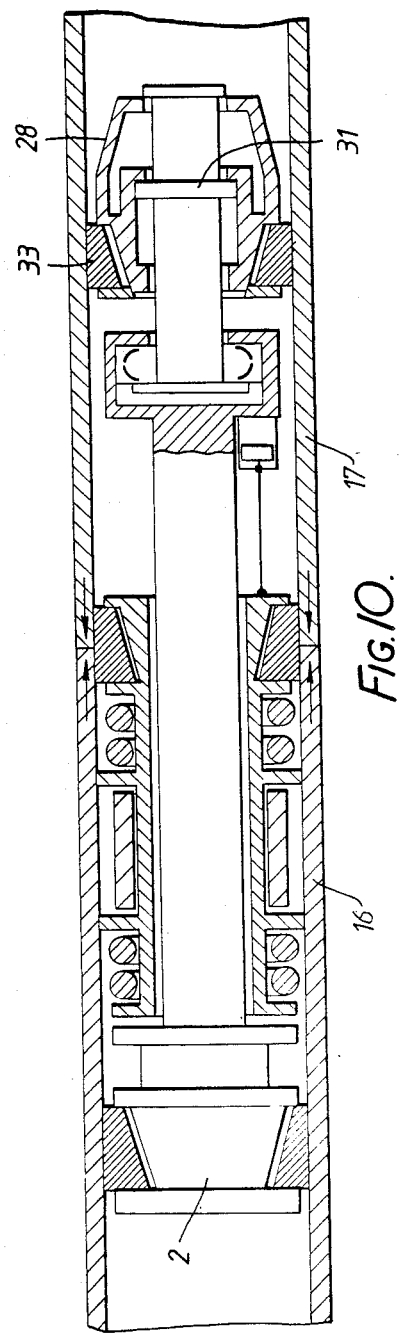

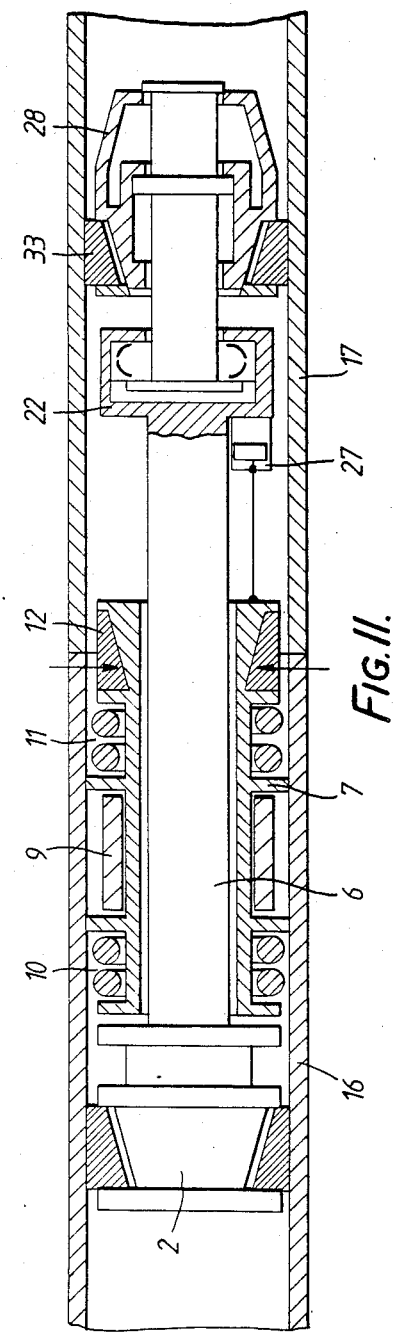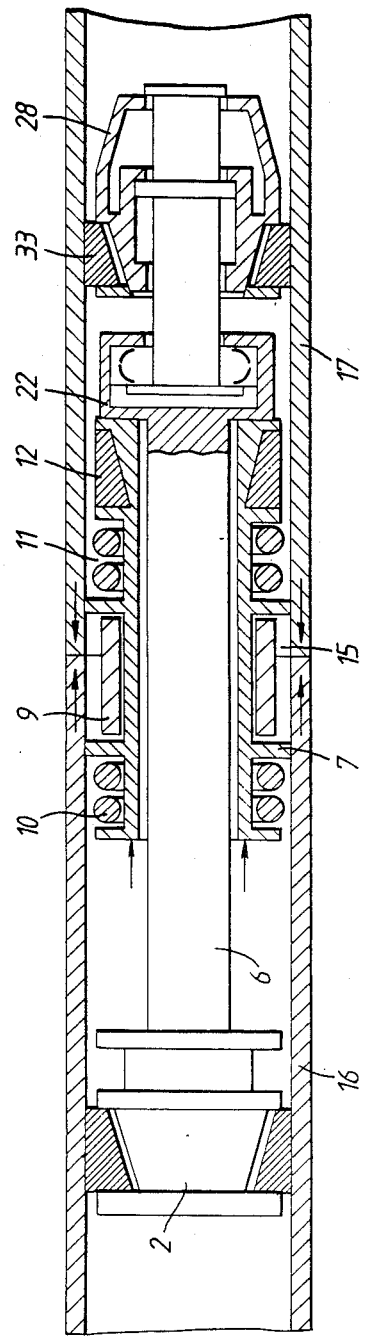

INTERNAL CHUCK FOR BUTT WELDING TWO TUBES

BACKGROUND OF THE INVENTION

The present invention relates to an internal chuck for introduction inside two tubes, e.g. pipe sections, to be butt joined by welding of their adjacent ends.

It is already known, for example from the U.S. Pat. No. 4,053,973, to use an internal chuck to move two tubes closer to one another so as to bring together the ends which are to be welded.

U.S. Pat. No. 4,493,966 discloses an internal chuck with two longitudinally spaced zones, one of the zones being intended for butting the tubes and the other zone for welding them, the chuck being provided with means of longitudinal displacement over a length equal to the distance separating these two zones.

However, this last-mentioned type of internal chuck does not itself apply a force to move the two tubes towards one another.

SUMMARY OF THE INVENTION

According to the invention there is provided an internal chuck for use in the butt joining of two tubes by welding together the abutting ends of the tubes, the chuck comprising an assembly of generally tubular shape provided with first gripping means adapted to grip internally one of the tubes, second gripping means adapted to grip internally the other tube, means for relative longitudinal displacement of the tubular assembly and the second gripping means, the tubular assembly including a sleeve which is slidably mounted on a central tube fixed relative to the remainder of the assembly, the sleeve carrying centering means adapted for radial extension for internal application against the tubes, and welding backup means for use in the welding process, the centering means and the welding backup means being longitudinally spaced from one another, and jack means for the longitudinal displacement of the sleeve relative to the central tube.

BRIEF DESCRIPTION OF THE DRAWINGS

The invention will be more fully understood from the following description of an embodiment thereof according to the invention, given by way of example only, with reference to the accompanying drawings.

In the drawings:

FIGS. 3 to 11 show diagrammatically various stages in the operation of butting and welding two lengths of tube.

DETAILED DESCRIPTION OF THE PREFERRED EMBODIMENTS

The chuck to be described hereinafter may, for example, be used in the joining of tubes on a floating platform for laying a pipeline at the bottom of a stretch of water by the so-called "S laying" method.

Figure 1:
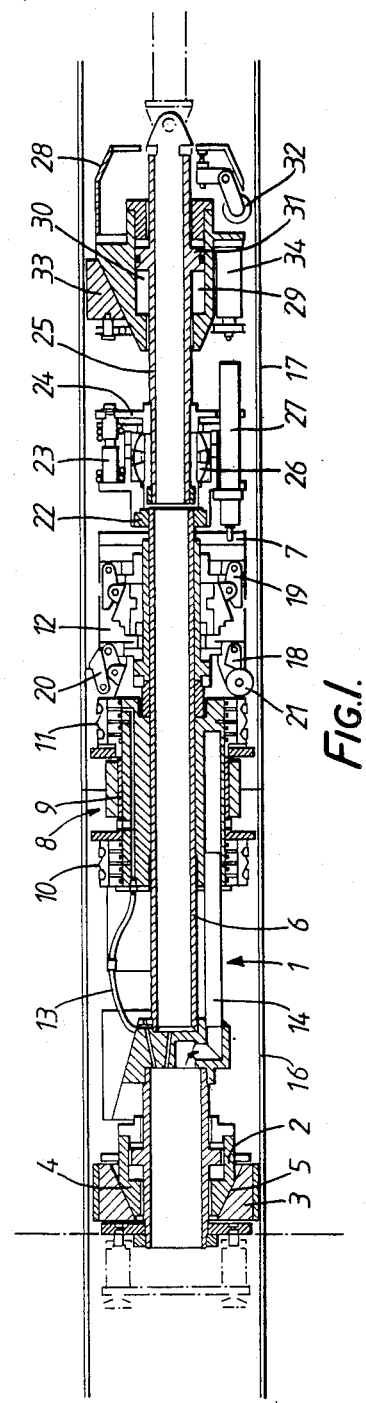
FIGS. 1 and 2 show an embodiment of an internal chuck according to the invention in elevation and partial section.
Figure 2:
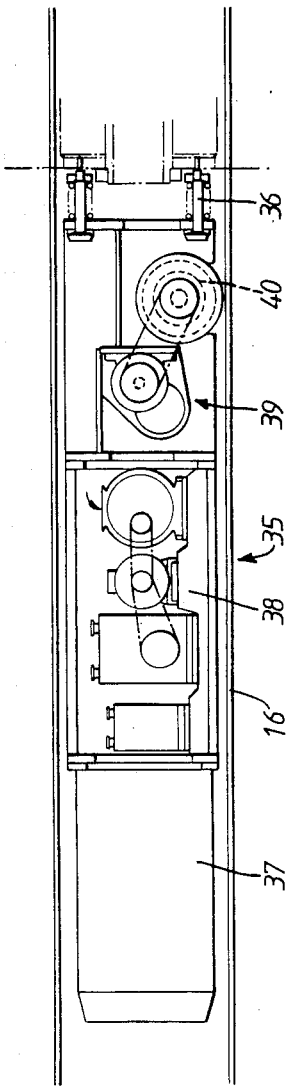

For convenience in the drawing one part of the chuck is shown in FIG. 1 and the other part is shown in FIG. 2, the left-hand end of FIG. 1 being brought together with the right-hand end of FIG. 2.

The part of the chuck shown in FIG. 1 is the only part of the chuck repeated diagrammatically in FIGS. 3 to 11. This part comprises a tubular assembly 1 provided with gripping means 2 having jaws 3 displaceable radially between a retracted inoperative position and an extended operative position through the action of a control fluid which causes longitudinal displacement of members 4, which are in contact through inclined faces 5 with the jaws 3. The tubular assembly 1 also comprises a central tube 6 around which a sleeve 7 is mounted so as to slide longitudinally relative thereto, the sleeve carrying a welding support or backup unit 8 comprising a fire shield 9 arranged between two pairs of inflatable seals 10 and 11, and centering means 12. FIG. 1 shows one of the pipes 13 for supplying pressurized fluid to the seals 10 and 11, and one of the pipes 14 for producing a vacuum in a fire shield chamber 15, shown in FIG. 3, which is defined, when the chuck is in use, between the tubes 16 and 17, the sleeve 7, and the seals 10 and 11. The centering means 12 is supplied with control fluid to deploy centering shoes 18 and 19, the means for supplying this fluid being omitted for clarity. Catches 20 enable the ends of the tubes 16, 17 to be sensed, and the sleeve 7 carries rollers 21 which bear against the inner wall of the tubes 16, 17.

At the opposite end to that provided with the gripping system 2, the central tube 6 carries a flange 22 which is connected by an elastic connection 23 to a flange 24 which is carried by ball joints 26 on an extension tube 25, the extension tube 25 being disposed substantially in line with the central tube 6.

The flange 22 carries the body of at least one hydraulic jack 27 comprising a cylinder fixed to the central tube 6 by means of the flange 22, and a piston connected to the sleeve 7. The means for supplying control fluid to the jack 27 has not been shown as it is well known.

The free end of the tube 25 is surrounded by an end support member 28, inside which a cylindrical recess 29 is provided to form, with the outer wall of tube 25, an annular cylinder 30 in which an annular piston 31 fixed to the tube 25 is slidable sealingly, to form a hydraulic system for relative longitudinal displacement of the tube 25 and support member 28, and whereby delivery of pressurized fluid into one or other of the two chambers into which the piston 31 divides the annular cylinder 30 will longitudinally displace the tube 25 and the support member 28 relative to one another. The support member 28 is provided with rollers 32 for bearing against the inside wall of the tubes 16, 17 and it also carries a plurality of jaws 33 which are displaceable radially by means of a system of inclined ramps, operated through the action of longitudinally disposed jacks 34.

On the other side of the gripping means 2 the chuck comprises a second chuck operating assembly 35 connected to the assembly 1 by an elastic connection 36. The operating assembly 35 comprises servo control means 37, pump means 38, and a motorization means 39 with wheels 40. The assembly 35 is constructed so as to effect operation of the chuck in the manner described hereafter with reference to FIGS. 3 to 12. As the assembly 35 uses well known techniques, it will not be described in greater detail. For the same reason, the various hydraulic and electrical connections are not shown in the drawings.

The sequence of operations may be as follows:

FIG. 3 shows the chuck having been introduced inside the two tubes 16 and 17, the tubes having been brought substantially into line, and the chuck arranged with the centering means 12 aligned with the end of tube 16 and its shoes radially extended to internally grip the end of the tube 16. The jaws of the gripping means 2 are then radially extended to clamp against the inside wall of the tube 16 (FIG. 4), and the support member 28 is moved out longitudinally by displacement of piston 31 to the left relative to member 28 (FIG. 5). Jaws 33 are then radially extended to clamp against the inside wall of the tube 17 (FIG. 6). Tubes 16 and 17 are then brought towards one another by displacing piston 31 to the right relative to the support member 28, and the shoes of the centering means 12 are then retracted radially (FIG. 7) allowing the lengths of tubes 16 and 17 to be brought into contact with one another without applying a compressive force (FIG. 8).

The shoes of the centering means 12 are again extended radially (FIG. 9) to centre the tubes 16, 17, and the force applied between the piston 31 and the support 28 is increased in order to effect a definitive butting of the two tubes (FIG. 10).

The shoes of the centering means 12 are then retracted radially (FIG. 11), and the jack 27 is operated to displace the sleeve 7 relative to the tube 6 longitudinally to the right in order to bring the fire shield 9 into line with the joint formed between the tubes 16 and 17 (FIG. 12). Welding can then be carried out with the aid of an external welding machine, such as an electron-beam welding machine, after the seals 10 and 11 have been inflated and a vacuum produced in the chamber 15.

After the welding process, the jaws 33 and those of the gripping means 2 are retracted and the sleeve 7 is returned to its original position, as shown in FIG. 3, the chuck being then ready for use in the connection of a further tube.

There is thus provided a chuck which is capable of moving two tubes, which are to be butt welded, towards each other and to center them relative to one another, and furthermore to present radially opposite the adjacent ends of the two tubes, a welding backup unit for use in the welding operation. The welding backup unit may consist of a fire shield surrounded by annular seals making it possible to form, together with the tubes, a fire shield chamber in which a vacuum can be established.

What is claimed is:

1. An internal chuck for use in the butt joining of two tubes (16, 17) by welding together abutting ends of the tubes, said chuck comprising an assembly of generally tubular shape provided with first gripping means (2) adapted to grip internally one of the tubes (16), second gripping means (28, 33) adapted to grip internally the other tube (17), means (30, 31) for relatively longitudinally displacing said tubular assembly and said second gripping means, said tubular assembly including a central tube (6) fixed relative to a remainder of said assembly, a sleeve (7) slidably mounted on the central tube and carrying centering means (12) adapted for radial extension for internal application against the tubes, welding backup means (8) for supporting a welding process, said centering means and said welding backup means being longitudinally spaced from one another, and jack means (27) for longitudinally displacing said sleeve relative to said central tube.

2. A chuck as claimed in claim 1, wherein said jack means is mounted between said sleeve and one longitudinal end of said central tube, and said first gripping means is mounted at the other longitudinal end of said central tube.

3. A chuck as claimed in claim 2, wherein said jack means is fixed to a flange (22) mounted on said central tube and is connected to an extension tube (25) disposed substantially in line with said central tube, said extension tube being surrounded by said second gripping means with the interposition of a hydraulic system for relative longitudinal displacement of said second gripping means and said extension tube.

* * * * *